US009367583B1

(12) United States Patent
Bernard et al.

(10) Patent No.: US 9,367,583 B1
(45) Date of Patent: Jun. 14, 2016

(54) SYSTEMS AND METHODS OF GENERATING CONTENT PERFORMANCE METRICS

(71) Applicant: Google Inc., Mountain View, CA (US)

(72) Inventors: Michael Bernard, Mountain View, CA (US); Ardan Arac, Mountain View, CA (US); Joshua Arron McAdams, Mountain View, CA (US)

(73) Assignee: Google Inc., Mountain View, CA (US)

( * ) Notice: Subject to any disclaimer, the term of this patent is extended or adjusted under 35 U.S.C. 154(b) by 247 days.

(21) Appl. No.: 14/086,767

(22) Filed: Nov. 21, 2013

(51) Int. Cl.
*G06F 17/30* (2006.01)

(52) U.S. Cl.
CPC ................... *G06F 17/30386* (2013.01)

(58) Field of Classification Search
CPC ................................................. G06F 17/30386
See application file for complete search history.

(56) References Cited

U.S. PATENT DOCUMENTS

| | | | |
|---|---|---|---|
| 7,831,586 B2 | 11/2010 | Reitter et al. | |
| 8,244,585 B1* | 8/2012 | Huang et al. | 705/14.41 |
| 8,494,900 B2 | 7/2013 | Axe et al. | |
| 8,543,453 B1 | 9/2013 | Calvert et al. | |
| 2007/0027761 A1* | 2/2007 | Collins et al. | 705/14 |
| 2009/0292677 A1* | 11/2009 | Kim | 707/3 |
| 2012/0054020 A1 | 3/2012 | Jacobs | |
| 2012/0095834 A1 | 4/2012 | Doig et al. | |
| 2013/0268347 A1 | 10/2013 | Bala et al. | |
| 2014/0025480 A1* | 1/2014 | Carter | 705/14.43 |
| 2014/0040011 A1* | 2/2014 | Kim | 705/14.43 |

OTHER PUBLICATIONS

"Calculate total metric based on sum of metric over specific time f . . . ", Jan. 28, 2010, pp. 1-4, http://www.pcreview.co.uk./forums

* cited by examiner

*Primary Examiner* — Kris Mackes
(74) *Attorney, Agent, or Firm* — Foley & Lardner LLP; John D. Lanza (57) ABSTRACT

Systems and methods of the present disclosure are directed generally to evaluating performance of a content group of a content provider. In some implementations, a system receives a request to display a performance score and accesses a data structure storing keywords, a quality metric for each keyword, and an impression count for each keyword. The quality metric can include a quality score or a first page bid of a keyword. The system can identify keywords of the data structure corresponding to the content group of the content provider. The system can obtain the quality metric and the number of impressions via the data structure for each keyword. The system can determine, for the content group, a performance score using an impression-based weighted average of the quality metric and impression count of each of the keywords.

17 Claims, 3 Drawing Sheets

SYSTEMS AND METHODS OF GENERATING CONTENT PERFORMANCE METRICS

BACKGROUND

In a networked environment such as the Internet, web publishers such as people or companies can provide information for display on web pages or other documents. The web pages can include text, video, or audio information provided by the entities via a web page server for display on the internet. Content providers, such as third party advertisers, can provide additional content for display on the web pages together with the information provided by the web publishers. A content selection server may select certain additional content to display on a rendering of a web page based on various factors including, e.g., content selection criteria associated with the content to be displayed. Thus, a person viewing a web page can access the information that is the subject of the web page, as well as selected third party content that may appear with the web page.

SUMMARY

Systems and methods of the present disclosure are directed generally to generating an aggregated performance score for content campaigns or content groups. More specifically, systems and methods of the present disclosure provide a tool for generating aggregated performance scores for content groups and content campaigns by taking the weighted average of the quality metrics for a content group and content campaign.

At least one aspect is directed to a method of evaluating a performance of a content group via a computer network. In some implementations, the method includes a processor executing on a data processing system receiving a request to display performance of a content group of a content provider. The method can include the data processing system accessing a data structure storing, in a memory element, several keywords, a quality metric for each keyword, and an impression count for each keyword. In some implementations, the quality metric is at least one of a quality score and a first page bid. In some implementations, the method can include the data processing system identifying keywords of the data structure corresponding to the content group of the content provider. The method can include the data processing system obtaining the quality metric and the impression count associated with the content group of the content provider. The data processing system can obtain the quality metric and the impression count via the data structure for each keyword. The method can include the data processing system determining, for the content group, a performance score. The data processing system can determine the performance score based on a weighted average of the quality metric and impression count of each of the keywords. The method can include the data processing system transmitting, for display on a user device, the performance score.

In some implementations, the method includes the data processing system determining the performance score by performing a summation of products of the quality metric and impression count of each keyword of the plurality of keywords. The method can include the data processing system dividing the summation by a sum of the impression count of each of the plurality of keywords.

In some implementations, the data structure includes a historical quality metric and a corresponding historical impression count for each of the keywords. The method can include the data processing system generating a second performance score based on the historical quality metric and corresponding impression count. The method can include the data processing system determining, based on a comparison of the performance score with the second performance score, that the content performance of the content group is improving.

In some implementations, the method includes the data processing system determining a second performance score for a second content group of the content provider. The method can include the data processing system comparing the performance score with the second performance score to identify a higher performance score. In some implementations, the method can include the data processing system transmitting an indication that one of the content group and the second content group corresponding to the higher performance score is a better performing content group.

In some implementations, the method includes the data processing system updating, responsive to a time interval, the quality metrics of at least one keyword of the data structure. In some implementations, the method includes the data processing system updating, responsive to displaying a content item associated with at least one of the keywords of the data structure, an impression count of the at least one keyword.

In some implementations, the method includes the data processing system identifying a content campaign of the content provider that includes content groups. The method can include the data processing system generating a performance score of the content campaign based on the quality metric and the impression count of each keyword of the content groups. In some implementations, the method can include the data processing system transmitting, for display on the user device, the performance score of the content campaign.

At least one aspect is directed to a system for evaluating a performance of a content group via a computer network. In some implementations, the system can include a processor executing on a server. The processor can be communicatively coupled to a memory element. In some implementations, the processor is configured to receive a request to display performance of a content group of a content provider. The processor can be configured to access a data structure storing keywords, a quality metric for each keyword, and an impression count for each keyword. The data structure can store the keywords, quality metrics, and impression count for each keyword in a memory element. The processor can be configured to identify the keywords of the data structure corresponding to the content group of the content provider. The processor can be configured to obtain, for each keyword, via the data structure, the quality metric and the impression count associated with the content group of the content provider. The processor can determine, for the content group, a performance score based on a weighted average of the quality metric and impression count of each of the keywords. The processor can transmit, for display on a user device, the performance score.

At least one aspect is directed to a computer readable storage device that includes processor executable instructions for evaluating a performance of a content group via a computer network. In some implementations, the instructions include instructions to receive a request to display performance of a content group of a content provider. The instructions can include instructions to access a data structure storing keywords, a quality metric for each keyword, and an impression count for each keyword. The data structure can store the keywords, quality metrics, and impression count for each keyword in a memory element. The instructions can include instructions to identify the keywords of the data structure corresponding to the content group of the content provider. The instructions can include instructions to obtain, for each keyword, via the data structure, the quality metric and the impression count associated with the content group of the content provider. The instructions can include instructions to determine, for the content group, a performance score based on a weighted average of the quality metric and impression count of each of the keywords. The instructions can include instructions to transmit, for display on a user device, the performance score.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Systems and methods of the present disclosure relate generally to evaluating the performance of a content group (e.g., one or more content items or advertisements associated with one or more keywords and a landing page) or a content campaign (e.g., one or more content groups that share a similar theme) by generating an aggregated performance score for the content group or content campaign. In various implementations, the system can evaluate an aggregate performance for a single keyword over an arbitrary time period, for multiple keywords of a content group (or other higher-level entity such as a content campaign, content provider, etc.), or for multiple keywords over an arbitrary time period.

In an illustrative implementation, the system can identify a quality metric (e.g., a first page bid amount or a quality score based on click through rate, conversion rate, relevancy, performance history, etc.) for one or more keywords associated with the content group. The system can further identify the number of impressions (e.g., an impression count) for one or more keywords associated with the content group. Quality and scores may vary among keywords of a content group. In some instances, a first keyword of a content group may have a higher quality score than a second keyword of a content group. In some instances, a first keyword of a content group may have a higher impression count than a second keyword of a content group. In some implementations, the impression count of a keyword is based on whether a keyword is included for display in a content item to a user of a user device on which the content item is displayed. In an illustrative implementation, a content group may include two keywords, a first keyword "car" and a second keyword "auto". Content items of the content group may have a total impression count of ten, where seven of the ten impressions included the keyword "car" and three of the ten impressions included the keyword auto. Thus, the impression count for the first keyword may be seven, while the impression count for the second keyword may be three. In some implementations, both keywords may be included in an impression, in which case the sum of the impression count of the keywords may be greater than the total number of content item impressions of the content group.

Upon identifying a quality metric and an impression count for each keyword of a content group, the system can determine a performance score for the content group. In some implementations, the system can determine the performance score for the content group by computing a weighted average based on the quality metrics and the impression count. The system may determine the performance score by summing the product of each keywords' quality score and impression count. The system may then divide the sum by the sum of the impression counts of each keyword to generate the performance score for the content group. In an illustrative implementation, a content group includes two keywords with quality scores of 10 and and impression counts of 100 and 50, respectively. The system can determine the performance score may be calculated as follows: (10*100+5*50)/(100+50)=8.33.

In some implementations, the performance score can be represented in various forms including, e.g., as a numerical value, percentage, normalized value, grade (e.g., A, B, C), or in another way that indicates how well (or poorly) a content group is performing.

In some implementations, systems and methods of the present disclosure can generate performance score for various collections of content items in order to evaluate performance or quality of higher-level entities such as content groups, content campaigns, content account, content provider, etc.).

In some implementations, systems and methods of the present disclosure can evaluate the performance of content groups (or higher-level entities) using historical quality metric and impression count information. In some implementations, the system can aggregate performance across time boundaries (e.g., if a quality score and impression count for a keyword changes from a first day to a second day, then the system can determine a performance score for the keyword over the two days using the quality metric and impression count for each day). That is, in various implementations, the system can evaluate an aggregate performance for a single keyword over an arbitrary time period, for multiple keywords, or for multiple keywords over an arbitrary time period.

Figure 1:
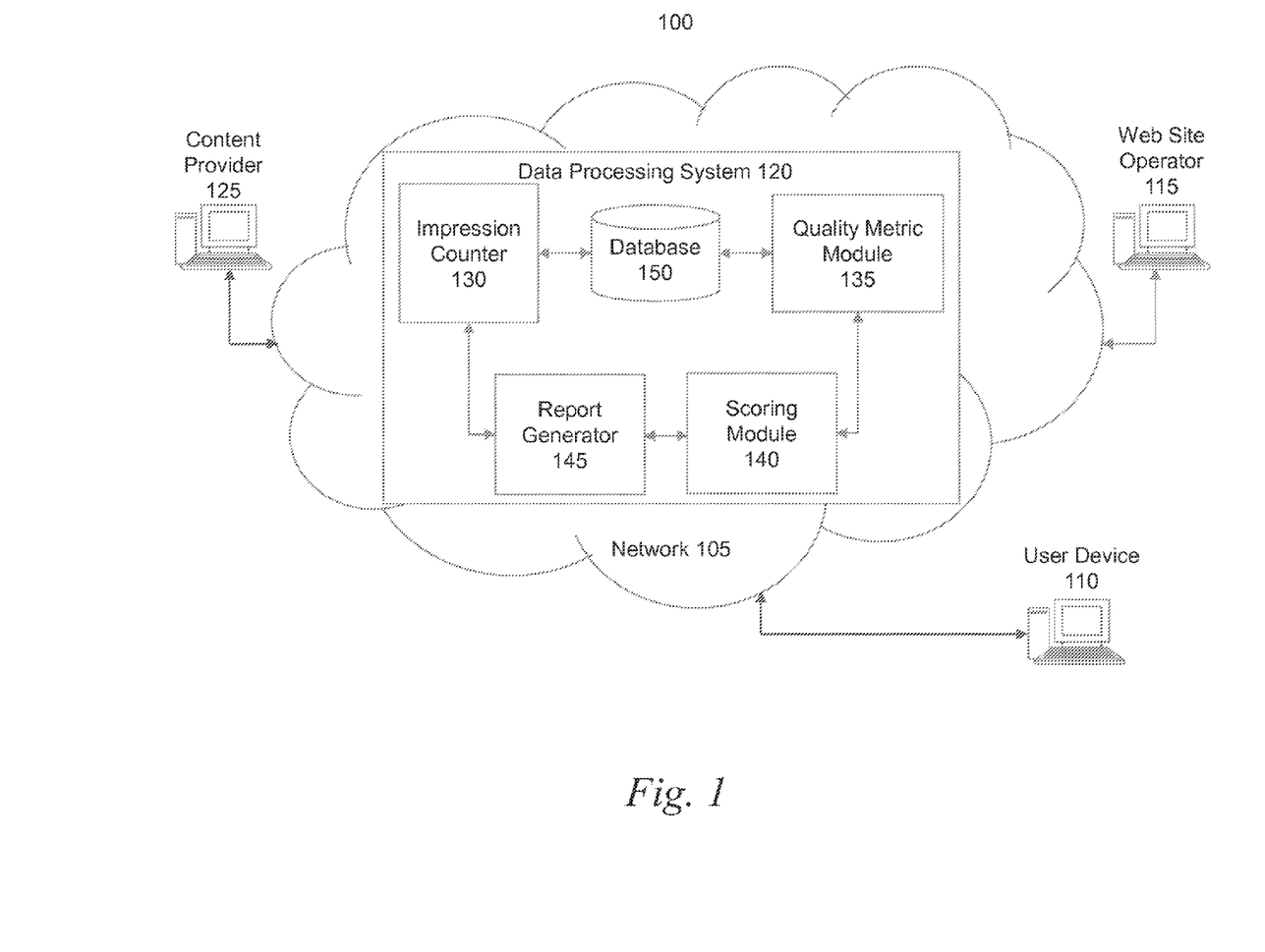
FIG. 1 is an illustration of one implementation of a system for evaluating a performance of a content group via a computer network.

FIG. 1 illustrates one implementation of a system 100 for evaluating a performance of a content group (or other higher-level entity) via a computer network such as network 105. The system 100 and its components, such as a data processing system 120, may include hardware elements, such as one or more processors, logic devices, or circuits. The network 105 can include computer networks such as the Internet, local, wide, metro, data, or other area networks, intranets, satellite networks, combinations thereof, and other communication networks such as voice or data mobile telephone networks. The network 105 can be used to access information resources such as web pages, web sites, domain names, or uniform resource locators that can be displayed on at least one user device 110, such as a laptop, desktop, tablet, personal digital assistant, smart phone, mobile computing devices, mobile telecommunication device, wearable computing device, or portable computer. For example, via the network 105 a user of the user device 110 can access web pages provided by at least one web site operator 115. In this example, a web browser of the user device 110 can access a web server of the web site operator 115 to retrieve a web page for display on a monitor of the user device 110. The web site operator 115 generally includes an entity that operates the web page. In one implementation, the web site operator 115 includes at least one web page server that communicates with the network 105 to make the web page available to the user device 110.

Although FIG. 1 shows a network 105 between the user device(s) 110, data processing system 120, content provider 125, and web site operator 115, the user device(s) 110, web site operator 115, content provider 125 and data processing system 125 may be on the same network 105. The network 105 can be a local-area network (LAN), such as a company Intranet, a metropolitan area network (MAN), or a wide area network (WAN), such as the Internet or the World Wide Web. In some implementations, there are multiple networks 105 between the user devices 110 and the data processing system 120, content provider 125, and web site operator 115. In one of these implementations, the network 105 may be a public network, a private network, or may include combinations of public and private networks.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 105 may include a wireless link, such as an infrared channel or satellite band. The topology of the network 105 may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some implementations, different types of data may be transmitted via different protocols. In other implementations, the same types of data may be transmitted via different protocols.

The system 100 can include at least one data processing system 120. The data processing system 120 can include at least one logic device such as a computing device having a processor to communicate via the network 105, for example with the user device 110, the web site operator 115, and at least one content provider 125. The data processing system 120 can include at least one server. For example, the data processing system 120 can include a plurality of servers located in at least one data center. In some implementations, the data processing system 120 may include multiple, logically-grouped servers and facilitate distributed computing techniques. In one of these implementations, the logical group of servers may be referred to as a server farm or a machine farm. In another of these implementations, the servers may be geographically dispersed. In other implementations, a machine farm may be administered as a single entity. In still other implementations, the machine farm includes a plurality of machine farms. The servers within each machine farm can be heterogeneous—one or more of the servers or machines can operate according to one type of operating system platform.

In some implementations, servers in the machine farm may be stored in high-density rack systems, along with associated storage systems, and located in an enterprise data center. Consolidating the servers in this way may facilitate system manageability, data security, the physical security of the system, and system performance by locating servers and high performance storage systems on localized high performance networks. Centralizing the servers and storage systems and coupling them with advanced system management tools allows more efficient use of server resources.

Management of the machine farm may be de-centralized. In some implementations, one or more servers may comprise components, subsystems and circuits to support one or more management services for the machine farm. In some of these implementations, one or more servers provide functionality for management of dynamic data, including techniques for handling failover, data replication, and increasing the robustness of the machine farm. Each server may communicate with a persistent store and, in some implementations, with a dynamic store.

Server may include a file server, application server, web server, proxy server, appliance, network appliance, gateway, gateway, gateway server, virtualization server, deployment server, secure sockets layer virtual private network ("SSL VPN") server, or firewall. In some implementations, the server may be referred to as a remote machine or a node.

The data processing system 120, content provider 125, web site operator 115, and user device 110 may be deployed or executed on any type of client or server, or any type and form of computing device, such as a computer, network device or appliance capable of communicating on any type and form of network and performing the operations described herein.

In some implementations, the data processing system 120 includes a content placement system having at least one server. The data processing system 120 can also include at least one impression counter 130, at least one quality metric module 135, at least one scoring module, and at least one database 150. In some implementations, the data processing system 120 can also include a report generator 145. The impression counter 130, quality metric module 135, scoring module 140 and report generator 145 can each include at least one processing unit or other logic device such as programmable logic array engine, or module configured to communicate with the database 150. The impression counter 130, quality metric module 135, scoring module 140 and report generator can be separate components, a single component, or part of the data processing system 120.

In some implementations, the data processing system 120 obtains anonymous computer network activity information associated with a plurality of user devices 110. A user of a user device 110 can affirmatively authorize the data processing system 120 to obtain network activity information corresponding to the user's user device 110. For example, the data processing system 120 can prompt the user of the user device 110 for consent to obtain one or more types of network activity information, such as geographic location information. The identity of the user of the user device 110 can remain anonymous and the user device 110 may be associated with a unique identifier (e.g., a cookie).

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

In some implementations, the data processing system 120 receives content or content items from a content provider 125, such as a commercial entity, online retailer, business, advertiser, individual or any entity that wants to provide content for display on a user device 110 via the computer network 105. The content or content items may include, e.g., text, characters, keywords, symbols, images, video, audio, or multimedia content. For example, a content item may include an online advertisement, article, promotion, coupon, or product description.

The data processing system 120 may provide the content item to the web page for display in response to receiving a request for content from a computing device such as, e.g., user device 110. In some implementations, the data processing system 120 receives the request via an application executing on the user device 110. For example, a mobile application executing on a mobile device (e.g., smart phone or tablet) may make a request for content. In another example, a web page server may request content from the data processing system 120 responsive to a user of a user device 110 visiting the web page.

In some implementations, the request for content includes information that can facilitate content selection (e.g., keywords, search query, topic information, geographic information, entities, historical data, etc.). In some implementations, the data processing system 120 may request information from the user device 110 to facilitate identifying content or selecting content. The data processing system 120 may request or obtain information responsive to receiving a request for content from the user device 110. The information may include information about displaying the content on the user device 110 (e.g., a content slot size or position) or available resources of user device 110 to display or otherwise manipulate the content. In some implementations, the information may indicate a web page category on which the content item is to be displayed, a geographic region associated with the user device on which the content item is to be displayed, or a language of the web page or content item.

The data processing system 120 can select content items for presentation based on matching attributes between the request and content item or results of an auction. For example, the data processing system 120 can receive bids from content providers and serve the content items associated with the highest bidders (or a combination of bid and the level of matching or other content item score) at the conclusion of the auction. The bids are amounts that the content providers are willing to pay for presentation (or selection) of their content item on web page. For example, a bid can specify an amount that a content provider is willing to pay for each 1000 impressions (e.g., presentations) of the content item, referred to as a CPM bid. Alternatively, the bid can specify an amount that the content provider is willing to pay for a user interaction with (e.g., a click-through of or hovering a pointer over) the advertisement or a "conversion" following user interaction with the advertisement.

In some implementations, the data processing system 120 can select content items for presentation on a search results page of a search engine based on a first page bid. The data processing system 120 can estimate a first page bid based on a quality score for a keyword and the competition for a keyword. The first page bid estimate for a keyword indicates the bid that may be needed for a content item to appear on the first page of search results when a search query matches the keyword. For example, a high first page bid for a keyword may indicate that the keyword has a low quality score.

Responsive to a request for content from a web page operator 115 or search engine operator 115, the data processing system 120 provides a content item for display with a web page (or search results page) on a user device 110. The content item may include one or more keywords of the content group. A user of the user device 110 may view the content item (e.g., an impression of the keyword) or may click on or select the content item (e.g., a click). In some implementations, the data processing system 120 or other server receiving or responding to the content request logs the impression. In some implementations, the impression is logged in response to receiving the request. In some implementations, the impression is logged responsive to serving the content item. In yet other implementations, the impression is logged response to some or all of the content item being viewable on the web page on the user device (e.g., the impression is logged responsive to 50% or more of the content item being viewable on a portion of the web page being displayed on the user device).

In some implementations, the data processing system includes an impression counter 130 designed and constructed to identify, count, determine, update or log the number of impressions of a keyword. In some implementations, the impression counter 130 can add one count to a current impression count responsive to receiving an indication of an impression. In an illustrative implementation, a keyword may be selected, based on a quality score or first page bid, for display with a content item that is being displayed on web page or search results page. The data processing system 120 can record the impression responsive to the keyword being selected for display with the content item, or responsive to the keyword being displayed on a web page or search results page with the content item.

In some implementations, the data processing system 120 can store, log, record, or obtain, for one or more impressions, an impression record and quality metric. The impression record can include information associated with the request for a content item, the response to the request to the content item, serving the content item, displaying the content item, or an indication of user interest in the content item. In some implementations, the impression record includes, for each impression, features associated with the impression such as a keyword of the content item, content item category, a web page category, a geographic region associated with the user device, a language associated with the web page or content item, a category associated with a search query, a user device type (e.g., mobile computing device, smartphone, laptop, desktop computer, tablet, operating system, touch enabled, etc.), a time of day of the impression, or other features that can facilitate content selection. In some implementations, the impression record includes an indication of user interest in the content item such as whether or not the user was interested in the content item (e.g., a click or no-click). The user may indicate interest by clicking on the content item, or making a selection, mouse over, finger gesture, shake motion, voice command, tap, or another indication that indicates user interest in the content item.

One or more data structures can store, in a memory element of the data processing system 120 (e.g., database 150) the impression records. The data structure can store the impression records in various ways. In some implementations, a data structure can store some or all impression records associated with a content provider 125, content campaign (e.g., a collection of content groups associated with a single theme or message) of a content provider 125, or a content group (e.g., a group of content items that share similar content selection criteria and lead to a same landing page). In some implementations, the impression records can be categorized by content provider type. Each impression record may be associated with a content provider identifier, content item identifier, or other unique identifier.

In some implementations, the data structure can store impression records for a content item, content provider, or content provider type in a table that includes one or more rows and columns. In an illustrative implementation, impression records can be stored for a content group in a table where each row corresponds to an impression of a keyword and each column corresponds to information or features associated with that keyword impression. Table 1 is an illustrative implementation of impression records for a keyword of a content group stored in a table form.

TABLE 1

Illustrative implementation ation of impression records

| Content Group ID | Keyword identifier | Quality score | First Page Bid | Time/Date |
|---|---|---|---|---|
| Content_group_1 | kw_1 | Score_1 | Bid_1 | Time_1 |
| Content_group_1 | kw_1 | Score_2 | Bid_2 | Time_2 |
| Content_group_1 | kw_1 | Score_3 | Bid_3 | Time_3 |

The features stored in the data structure (e.g., content group identifier, keyword identifier, quality score, first page bid, and time/date) may include at least one number, letter, character, or symbol. In some implementations, the values or entries for a feature may include real numbers, text, strings, characters, keywords, binary numbers, or other indicator of information associated with a field. In some implementations, the values or entries may correspond to a taxonomy or schema associated with a keyword. In some implementations, the entries may include unambiguous entities (e.g., person, place or thing) that include unique identifiers corresponding to an entity taxonomy.

In some implementations, the data processing system 120 can update the data structure in real time (e.g., responsive to each impression of the keyword). In some implementations, the data procession system may store various impression information in the data structure. In another illustrative implementation, impression records can be stored for a content group in a table where each row corresponds to a keyword of the content group and each column corresponds to information about the keyword. Table 2 is another illustrative implementation of impression records for keywords of a content group stored in a table form.

TABLE 2

Illustrative implementation ation of impression records

| Content Group ID | Keyword identifier | Quality score | First Page Bid | Impression Count |
|---|---|---|---|---|
| Content_group_1 | kw_1 | Score_1 | Bid_1 | Count_1 |
| Content_group_1 | kw_2 | Score_2 | Bid_2 | Count_2 |
| Content_group_1 | kw_3 | Score_3 | Bid_3 | Count_3 |

In Table 2, the data structure stores the content group identifier, keyword identifier, quality score, first page bid and impression count. The data structure may store some or all of this information for one or more keywords of the content group or other higher-level entity (e.g., content campaign, content provider). In some implementations, the data processing system may store the keyword identifier and impression count in a first data structure, and store the corresponding quality score or first page bid information in a second data structure. The data structures may include additional columns that indicate a content campaign, content provider or other higher-level entity. In some implementations, the data processing system 120 may update the impression count responsive to a keyword impression. The data processing system 120 may also update a quality score or first page bid in real time (e.g., responsive to an impression count or a change in a quality metric) or based on a time interval (e.g., daily, bi-weekly, weekly). In some implementations, the data processing system 120 may store a separate data structure for different time period (e.g., a separate data structure or table for each day or week). In some implementations, a data structure may include some or all the information of table 1 and table 2.

In some implementations, the data structure may store conversion information or a conversion count. A conversion occurs when a user initiates or completes a transaction related to a content item provided with a web page. What constitutes a conversion may vary from case to case and can be determined in a variety of ways. For example, a conversion may occur when a user clicks on a content item, is then referred or directed to a web page, and initiates a purchase on the web page. A conversion can also be defined by a content provider to be any measurable/observable user action such as, for example, downloading a white paper, navigating to at least a given depth of a website, viewing at least a certain number of web pages, spending at least a predetermined amount of time on a website or web page, registering an account on a website, etc. Other actions that constitute a conversion can also be used.

The data processing system 120 can obtain information to store in the data structure from various sources including, e.g., an impression counter 130, quality metric module 135, database 150 or any other source accessible by the data processing system 120. In some implementations, the data processing system 120 processes, filters or otherwise analyzes the information before storing in the data structure (e.g., matching a received keyword identifier with a keyword identifier of the data structure, and updating the corresponding quality score, first page bid or impression count). The data processing system 120 can obtain the information in real-time (e.g., responsive to a change in a quality score, first page bid, or impression count), in a batch process (e.g., receive all information associated with a keyword, content group or other high-level entity on a periodic basis), responsive to a request (e.g., from an administrator of the data processing system 120, or a content provider 125), or responsive to another event or condition or some other time interval that facilitates evaluating the performance of a higher-level entity such as a content group or content campaign.

In some implementations, the data processing system 120 includes a quality metric module 135 designed and constructed to identify, obtain, receive or determine a quality metric of a keyword. In some implementations, the quality metric module 135 may obtain or receive quality metric information from another source accessible via the data processing system 120 or network 105. In some implementations, the quality metric module 135 may identify or determine a quality metric of a keyword in real time, based on a time interval, or responsive to a condition or event. In some implementations, the quality metric may include at least one of a quality score, first page bid, relevance score, predicted click through rate, or other quality or performance metric.

In some implementations, the quality metric module 135 can obtain a quality score or first page bid in real time. In some implementations, the data processing system 120 (or other content selection server) determines a quality score for a keyword responsive to requests for content in order to facilitate content selection. The quality score for a keyword can be determined based on a relevancy of the keyword or keyword performance (e.g., click through rate, conversion rate, or predicted click through rate). In some implementations, the relevancy of a keyword is based on the similarity (e.g., matching keyword, matching semantic concept, or vertical) of a keyword to a search query input into a search engine. In some implementations, the relevancy of the keyword is based on the similarity of the keyword to text of a landing web page requesting the content item. In some implementations, the relevancy of a keyword is based on information associated with the content request (e.g., information associated with a user device making the request for content such as user interest information, geographic location, device type, etc.). In some implementations, relevancy of a keyword can be determined using a semantic analysis (e.g., probabilistic latent semantic analysis) to identify a concept or topic of a web page, and match the topic of the web page with a topic associated with the keyword. In some implementations, the relevancy of a keyword can be based on a frequency of occurrence, placement, or font style of a keyword on a landing web page.

In some implementations, the data processing system 120 (e.g., via quality metric module 135) determines or identify a first page bid based on a quality score or relevancy score and an online bid auction. In an illustrative implementation, a plurality of content providers may bid on a keyword such that a content item associated with the keyword can be selected for display on a first page of a search results page. In some implementations, an increase in the relevancy of a keyword with respect to a search query or landing web page (e.g., a higher the quality score), corresponds to a decrease in a first page bid amount. In some implementations, a decrease in the relevancy of a keyword with respect to a search query or landing web page (e.g., a lower quality score), corresponds to an increase in a first page bid amount.

In some implementations, the quality score or first page bid for a keyword is recorded for each impression of the keyword with the content item. In some implementations, the quality metric module 135 can obtain a quality score or first page bid or a keyword on a daily basis or other time interval. In an illustrative implementation, a quality score may have negligible fluctuation throughout a time period (e.g., one day, two days, a week). Thus, it may be sufficient for the data processing system 120 to generate a performance score using a single quality metric value for single day (or other time period). In some implementations, the data processing system 120 can vary the time period or frequency with which a quality metric for a keyword is updated based on an observed or monitored fluctuation of a quality metric, the number of impressions for a keyword, or other factor. In an illustrative implementation, the data processing system 120 may obtain an updated quality metric for every 1,000 impressions of a keyword. In another illustrative implementation, the data processing system 120 may determine that a quality metric for a keyword fluctuates on a periodic basis (e.g., every 12 hours, daily, bi-weekly) and update the quality metric according to a predicted fluctuation of the quality metric based on a historical analysis of the quality metric.

In some implementations, the data processing system 120 includes a scoring module 140 designed and constructed to determine a performance score for a higher-level entity such as a content group, content campaign, content provider. In some implementations, the scoring module 140 can determine an aggregated performance score for a keyword over a time interval, an aggregated performance score for multiple keywords, or an aggregated performance score for multiple keywords over a time interval. In some implementations, the scoring module 140 determines a performance score using an impression-based weighted average. The scoring module 140 can compute, for one or more keywords, the impression-based weighted average of a quality metric such as a quality score, first page, or other quality metric indicative of a quality or performance of a keyword.

In some implementations, scoring module 140 determines the performance score by performing a summation of products of the quality metric and impression count of each keyword of the plurality of keywords. The scoring module 140 can then divide the summation by a sum of the impression count of each of the plurality of keywords. In some implementations, the scoring module 140 computes an impression-based weighted average using the following formula:

Equation 1: Performance Score $$\text{performance\_score} = \frac{\sum_{k=1}^{n} \text{metric}_k * \text{impressions}_k}{\sum \text{impressions}_k}$$

In Equation 1, the performance score is computed for one or more keywords of a higher-level entity (e.g., content group). In the above equation, and in some implementations, the $\text{metric}_k$ refers to a quality metric for a keyword "k"; and the $\text{impressions}_k$ refers to an impression count or number of impressions for a keyword during a given time interval. Using equation 1, the scoring module 140 can multiply a quality metric of a keyword by the impression count for the keyword. The scoring module 140 can repeat this for multiple keywords of a content group, and sum the products. The scoring module 140 can then divide the sum of the product by the sum of the number of impressions for each keyword.

In an illustrative implementation, a content group includes a first keyword and a second keyword with quality scores of 10 (metric1) and 5 (metric2) and number of impressions of 100 (impressions1) and 50 (impressions2), respectively. The scoring module 140 can determine the performance score as follows:

$$\text{performance\_score} = \frac{(\text{metric1} * \text{impressions1} + \text{metric2} * \text{impressions2})}{\text{impressions1} + \text{impressions2}}$$

$$\text{performance\_score} = \frac{10 * 100 + 5 * 50}{100 + 50} \simeq 8.33$$

In some implementations, the scoring module 140 can generate an aggregate performance score for a single keyword over time. The scoring module 140 may use equation 1 to compute an impression-based weighted average. However, instead of summing a product of a quality metric and impression count for multiple keywords, the scoring module 140 may sum a product of a quality metrics and impression counts for a single keyword corresponding to multiple time intervals. In an illustrative implementation, the quality score and impression count for a keyword on a first day may be 10 and 20, respectively, and 9 and 10 on a second day. Thus, the aggregated performance score over the two day time interval may be [(10*20)+(9*10)]/(20+10)~=9.67.

In some implementations, the scoring module 140 can generate an aggregate performance score for multiple keywords over multiple time periods. In an illustrative implementation, a first keyword and a second keyword have a quality score and impression count for each of a first time interval and a second time interval. The scoring module 140 may compute the performance score as follows: (A_metric_1*A_impressions_1+A_metric_2*A_impressions_2+B_metric_1*B_impressions_1+B_metric_2*B_impressions_2)/(A_impressions_1+A_impressions_2+B_impressions_1+B_impressions_2); wherein prefix A and B refer to the first and second keywords, respectively, and suffix 1 and 2 refer to the first and second time intervals, respectively.

In some implementations, the scoring module 140 can pre-process the input data (e.g., data structure) to determine if there is a sufficient impression count or type of data to determine a performance score that is useful or relevant. If the scoring module 140 determines that the impression count or other data is not sufficient to generate a valid performance score, the scoring module 140 can wait to determine a performance score until there are a sufficient number of impressions. In an illustrative implementations, a request for content performance may indicate to generate a performance score upon keywords of the content group receiving a certain number of impressions in a time period. In some implementations, the request for a performance score may indicate to determine a performance score upon a certain number or percentage of keywords of a content group or other higher-level entity each receiving a certain number of impressions. In some implementations, the request for performance score may indicate to compare performance scores based on a time interval for a certain number of time intervals (e.g., determine performance scores on a daily basis for five days and identify the highest performance score).

In some implementations, the scoring module 140 can determine multiple performance scores and compare performance scores to identify higher performance scores. In some implementations, the multiple performance scores can correspond to different or overlapping time intervals (e.g., historical performance compared to a current performance of a keyword). The scoring module 140 may determine that the current performance score is higher than the historical performance score, and thus indicate that that the performance is improving. In some implementations, the multiple performance scores can correspond to multiple content groups or high-level entities. The scoring module 140 may determine that the performance score of a first content group is higher than a performance score of a second content group, and thus indicate that the first content group is performing better than a second content group. The scoring module 140 can compare the performances among one or more content group over one or more time intervals.

In some implementations, the data processing system 120 can store the determined performance score in a data structure. In some implementations, the data processing system 120 transmits the determined performance to a content provider 125 or other computing device requesting the performance score. In some implementations, the data processing system 120 can include a report generator 145 designed and constructed to generate reports including performance scores. The reports may include one or more performance scores, performance score comparisons, performance score predictions based on historical performance scores or patterns of historical performance score. The report generator 145 can generate reports that include graphs, tables, charts, and provide same via network to a computing device for display.

Figure 2:
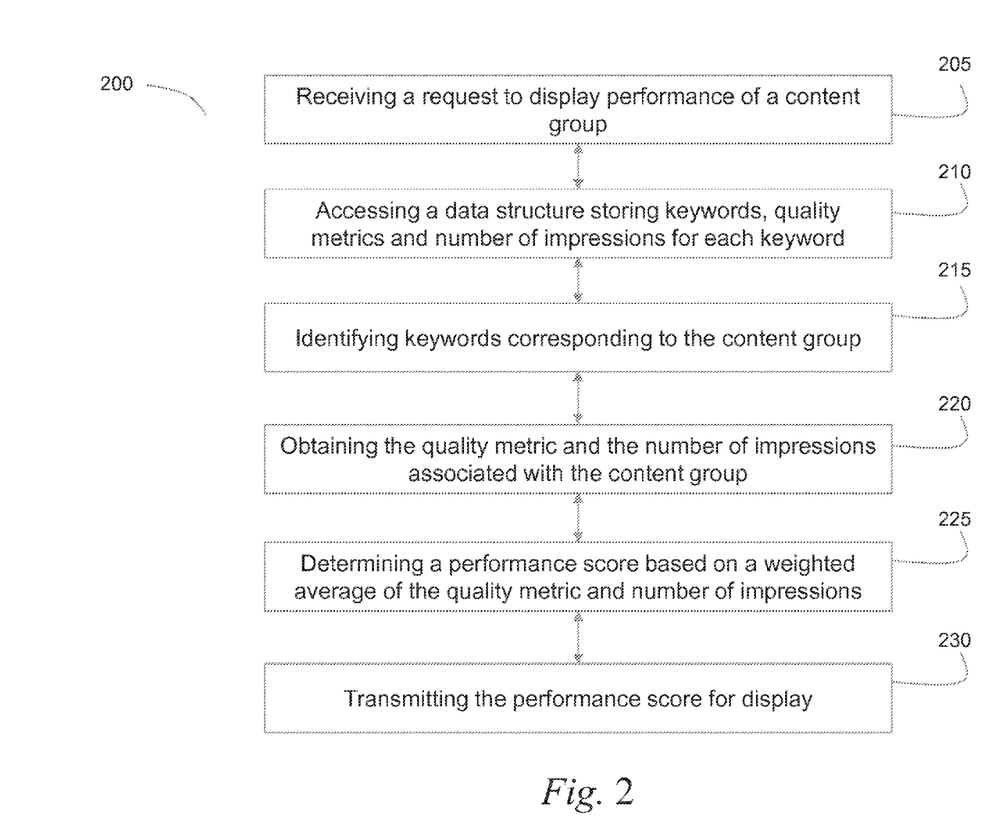
FIG. 2 is an illustration of one implementation of a method of evaluating a performance of a content group via a computer network.

FIG. 2 is an illustration of one implementation of a method 200 of evaluating a performance of a content group via a computer network. In brief overview, the method 200 can include a data processing system receiving a request to display performance of a content group of a content provider (205). The method 200 can include the data processing system accessing a data structure storing, in a memory element, several keywords, a quality metric for each keyword, and a number of impressions for each keyword (210). In some implementations, the quality metric is at least one of a quality score and a first page bid. The method 200 can include the data processing system identifying keywords of the data structure corresponding to the content group of the content provider (215). The method 200 can include the data processing system obtaining the quality metric and the number of impressions associated with the content group of the content provider (220). The data processing system can obtain the quality metric and the number of impressions via the data structure for each keyword. The method 200 can include the data processing system determining, for the content group, a performance score (225). The data processing system can determine the performance score based on a weighted average of the quality metric and number of impressions of each of the keywords. The method 200 can include the data processing system transmitting, for display on a user device, the performance score (230).

In further detail, and in some implementations, the method 200 includes a data processing system receiving a request to display a performance of a content group. The data processing system may receive the request from a content provider or administrator of a data processing system. The data processing system may receive the request via a computer network. The request may include information that the data processing system can use to determine a performance score. In some implementations, the request for performance may include information about a content group or content campaign (or other higher-level entity) for which to determine a performance score. In some implementations, the request for performance may include one or more keyword identifiers for which to determine a performance score. In some implementations, the request for performance may include one or more time intervals for which to determine a performance score. In yet other implementations, the request for performance score may include a type of performance score (e.g., aggregated based on multiple keywords, multiple time intervals, or multiple keywords and time intervals). In some implementations, the request for performance score may include a request to compare performance scores (e.g., among different content groups or time intervals) and identify a better performing content group or keyword.

In some implementations, the method 200 includes the data processing system accessing a data structure storing, in a memory element, one or more keywords, a quality metric for the one or more keywords, and a number of impressions (e.g., impression count) for the one or more keywords (210). In some implementations, the data processing system identifies a data structure corresponding to information received in the request for a performance (e.g., content provider identifier, content group identifier, performance score type, etc.).

In some implementations, the method 200 includes the data processing system identifying keywords of the data structure corresponding to a content group of the content provider (215). The data processing system may receive the content group and content provider information via the request for a performance score. The method may include the data processing system searching, parsing, filtering or otherwise identifying information stored in the data structure that is used to determine a performance score in accordance with the request for a performance score.

The data processing system can determine which columns, rows, entries, or fields of the data structure to identify based on information provided in the request to compute the performance score or other information indicative of data necessary to compute the performance score. In some implementations, where the performance score is to be determined for a content group, the method 200 includes the data processing system identifying rows or columns of the data structure that correspond to, e.g., a content group identifier. Upon identifying a content group identifier, the data processing system can identify corresponding keywords of the content group. The data processing may further identify quality metrics and impression counts associated with the keyword identifier. In some implementations, the data processing system can identify historical values for quality metrics and impression counts corresponding to a keyword identifier, content group identifier, or other high-level entity.

In some implementations, the method 200 includes the data processing system obtaining a quality metric and the number of impressions associated with the content group (220). The data processing system can obtain, via the data structure, the quality metric and number impressions for each keyword of the content group. In some implementations, the data processing system may obtain identifiers or pointers to data of the data structure rather than copy the data to another location of memory, while in other implementations the method includes copying, to a temporary memory, some or all the information from the data structure that will be used to determine a performance score.

In some implementations, the method 200 includes the data processing system determining a performance score (225). The data processing system can determine the performance score for the content group using an impression-based weighted average. In some implementations, the method 200 includes the data processing system determining a performance score based on a weighted average of the quality metric and number of impressions for each of the keywords of the content group. In some implementations, the method 200 includes the data processing system determining the performance score by summing a product of a quality metric and impression count for each keyword, and dividing the sum by the sum of all impression counts of the keywords. In some implementations, the method 200 includes generating an intermediary metric for the first sum (e.g., the sum of the products of the quality metric and the impression count for each keyword), and dividing the sum by the sum of the number of impressions of the keywords.

In some implementations, the method 200 includes the data processing system determining performance scores for at least two content groups of a content campaign and comparing the performance scores of the content groups to identify a highest performance score. In some implementations, the method 200 includes the data processing determining a historical performance score based on a historical quality metric and impression count and comparing the historical performance score with a performance score for a different time interval (e.g., current performance score).

In some implementations, the method 200 includes a data processing system transmitting the performance score for display on a computer device (230). In some implementations, the method 200 includes a data processing generating a report including a performance score and transmitting the report for display on a computing device. In some implementations, the method 200 includes generating a report that includes a comparison of two or more performance scores, or providing an indication that one performance score is better than another performance score (e.g., a first content group performs better than a second performance group).

Figure 3:
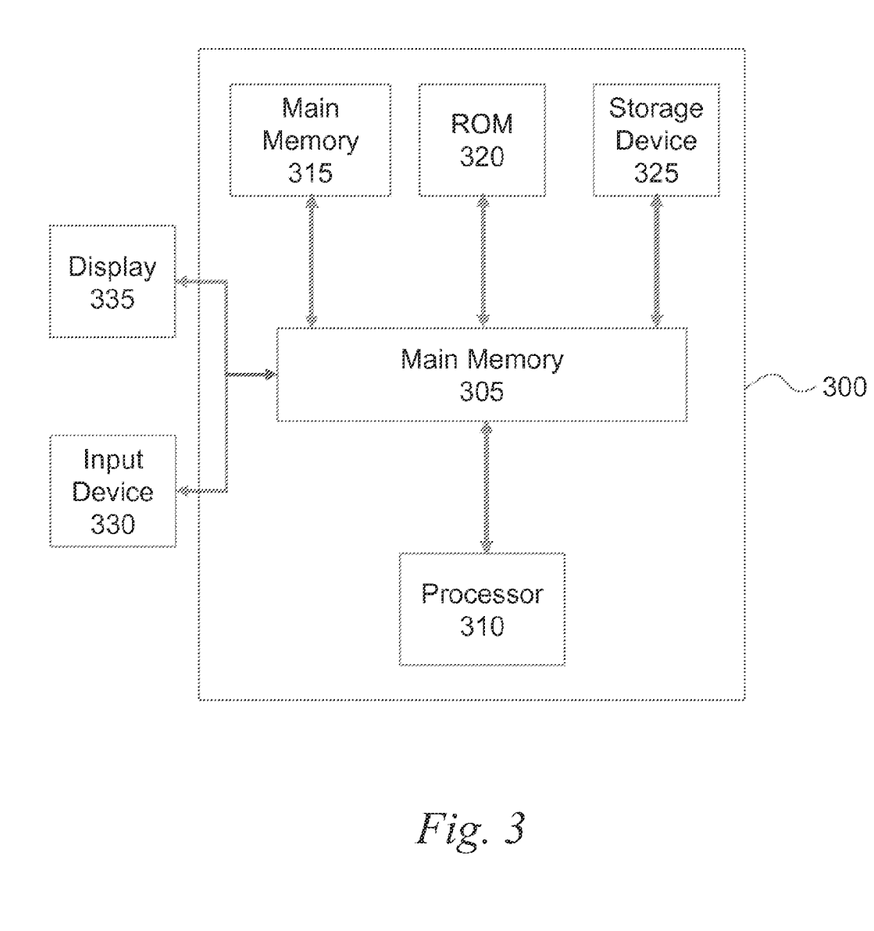
FIG. 3 is a block diagram illustrating a general architecture for a computer system that may be employed to implement various elements of the systems and methods described herein, in accordance with an implementation.

FIG. 3 is a block diagram of a computing system 300 in accordance with an illustrative implementation. The computing system or computing device 300 can be used to implement the system 100, content provider 125, user device 110, web site operator 115, data processing system 120, impression counter 130, quality metric module 135, scoring module 140, report generator 145, and database 150. The computing system 300 includes a bus 305 or other communication component for communicating information and a processor 310 or processing circuit coupled to the bus 305 for processing information. The computing system 300 can also include one or more processors 310 or processing circuits coupled to the bus for processing information. The computing system 300 also includes main memory 315, such as a random access memory (RAM) or other dynamic storage device, coupled to the bus 305 for storing information, and instructions to be executed by the processor 310. Main memory 315 can also be used for storing position information, temporary variables, or other intermediate information during execution of instructions by the processor 310. The computing system 300 may further include a read only memory (ROM) 320 or other static storage device coupled to the bus 305 for storing static information and instructions for the processor 310. A storage device 325, such as a solid state device, magnetic disk or optical disk, is coupled to the bus 305 for persistently storing information and instructions.

The computing system 300 may be coupled via the bus 305 to a display 335, such as a liquid crystal display, or active matrix display, for displaying information to a user. An input device 330, such as a keyboard including alphanumeric and other keys, may be coupled to the bus 305 for communicating information and command selections to the processor 310. In another implementation, the input device 330 has a touch screen display 335. The input device 330 can include a cursor control, such as a mouse, a trackball, or cursor direction keys, for communicating direction information and command selections to the processor 310 and for controlling cursor movement on the display 335.

According to various implementations, the processes described herein can be implemented by the computing system 300 in response to the processor 310 executing an arrangement of instructions contained in main memory 315. Such instructions can be read into main memory 315 from another computer-readable medium, such as the storage device 325.

Execution of the arrangement of instructions contained in main memory 315 causes the computing system 300 to perform the illustrative processes described herein. One or more processors in a multi-processing arrangement may also be employed to execute the instructions contained in main memory 315. In alternative implementations, hard-wired circuitry may be used in place of or in combination with software instructions to effect illustrative implementations. Thus, implementations are not limited to any specific combination of hardware circuitry and software.

Although an example computing system has been described in FIG. 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of evaluating a performance of a content group via a computer network, the method comprising:
    receiving, by a processor executing on a data processing system, a request to display performance of a content group of a content provider;
    accessing a data structure storing, in a memory element, a plurality of keywords, a quality metric for each keyword, and an impression count for each keyword;
    identifying, by the data processing system, one or more keywords of the plurality of keywords of the data structure corresponding to the content group of the content provider,
    obtaining, for each of the one or more keywords, via the data structure, the quality metric and the impression count associated with the content group of the content provider;
    determining, for the content group, a performance score based on a weighted average of the quality metric and impression count of each of the one or more keywords of the plurality of keywords by performing a summation of products of the quality metric and impression count of each of the one or more keywords of the plurality of keywords and dividing the summation by a sum of the impression count of each of the one or more keywords of the plurality of keywords; and
    transmitting, for display on a user device, the performance score.

2. The method of claim 1, wherein the data structure comprises a historical quality metric and a corresponding historical impression count for each of the plurality of keywords, and the method comprises:
    generating a second performance score based on the historical quality metric and corresponding impression count; and
    determining, based on a comparison of the performance score with the second performance score, that the content performance of the content group is improving.

3. The method of claim 1, comprising:
    determining a second performance score for a second content group of the content provider, and
    comparing the performance score with the second performance score to identify a higher performance score.

4. The method of claim 3, comprising:
    transmitting an indication that one of the content group and the second content group corresponding to the higher performance score is a better performing content group.

5. The method of claim 1, comprising:
    updating, responsive to a time interval, the quality metrics of at least one keyword of the data structure.

6. The method of claim 1, comprising:
    updating, responsive to displaying a content item associated with at least one keyword of the plurality of keywords of the data structure, the impression count of the at least one keyword.

7. The method of claim 1, comprising:
    identifying a content campaign of the content provider that includes a plurality of content groups; and
    generating a performance score of the content campaign based on the quality metric and the impression count of each keyword of the plurality of content groups.

8. The method of claim 7, comprising:
    transmitting, for display on the user device, the performance score of the content campaign.

9. The method of claim 1, wherein the quality metric is one of a quality score and a first page bid.

10. A system for evaluating a performance of a content group via a computer network, comprising:
    a processor executing on a server and communicatively coupled to a memory element, the processor configured to:
    receive a request to display performance of a content group of a content provider;
    access a data structure storing, in the memory element, a plurality of keywords, a quality metric for each keyword, and a number of impressions for each keyword;
    identify one or more keywords of the plurality of keywords of the data structure corresponding to the content group of the content provider;
    obtain, for each of the one or more keywords, via the data structure, the quality metric and the number of impressions associated with the content group of the content provider;
    determine, for the content group, a performance score based on a weighted average of the quality metric and number of impressions of each of the one or more keywords of the plurality of keywords by performing a summation of products of the quality metric and impression count of each of the one or more keywords of the plurality of keywords and dividing the summation by a sum of the impression count of each of the one or more keywords of the plurality of keywords; and
    transmit, for display on a user device, the performance score.

11. The system of claim 10, wherein the data structure comprises a historical quality metric and a corresponding historical number of impressions for each of the plurality of keywords, and the processor is further configured to:
    generate a second performance score based on the historical quality metric and corresponding number of impressions; and
    determine, based on a comparison of the performance score with the second performance score, that the content performance of the content group is improving.

12. The system of claim 10, wherein the processor is further configured to:
    determine a second performance score for a second content group of the content provider,
    compare the performance score with the second performance score to identify a higher performance score; and
    transmit an indication that one of the content group and the second content group corresponding to the higher performance score is a better performing content group.

13. The system of claim 10, wherein the processor is further configured to:
    update, responsive to a time interval, the quality metrics of at least one keyword of the data structure.

14. The system of claim 10, wherein the processor is further configured to:

update, responsive to displaying a content item associated with at least one keyword of the plurality of keywords of the data structure, an impression count of the at least one keyword.

15. The system of claim 10, wherein the processor is further configured to:

identify a content campaign of the content provider that includes a plurality of content groups; and generate a performance score of the content campaign based on the quality metric and the number of impressions of each keyword of the plurality of content groups.

16. The system of claim 10, wherein the quality metric is one of a quality score and a first page bid.

17. A non-transitory computer readable storage device comprising processor executable instructions for evaluating a performance of a content group via a computer network, the instructions comprising instructions to:

receive a request to display performance of a content group of a content provider;

access a data structure storing, in the memory element, a plurality of keywords, a quality metric for each keyword, and a number of impressions for each keyword;

identify one or more keywords of the plurality of keywords of the data structure corresponding to the content group of the content provider, obtain, for each of the one or more keywords, via the data structure, the quality metric and the number of impressions associated with the content group of the content provider;

determine, for the content group, a performance score based on a weighted average of the quality metric and number of impressions of each of the one or more keywords of the plurality of keywords by performing a summation of products of the quality metric and impression count of each of the one or more keywords of the plurality of keywords and dividing the summation by a sum of the impression count of each of the one or more keywords of the plurality of keywords; and transmit, for display on a user device, the performance score.

* * * * *